United States Patent
Grove

(10) Patent No.: US 6,256,784 B1
(45) Date of Patent: Jul. 3, 2001

(54) INTERPRETER WITH REDUCED MEMORY ACCESS AND IMPROVED JUMP-THROUGH-REGISTER HANDLING

(75) Inventor: Daniel D. Grove, San Jose, CA (US)

(73) Assignee: ATI International SRL, Barbados, WI (US)

( * ) Notice: Subject to any disclaimer, the term of this patent is extended or adjusted under 35 U.S.C. 154(b) by 0 days.

(21) Appl. No.: 09/134,042

(22) Filed: Aug. 14, 1998

(51) Int. Cl.[7] ..................................................... G06F 9/45
(52) U.S. Cl. ........................................ 717/9; 717/4; 711/1
(58) Field of Search .................................. 395/709, 704, 395/500.47; 711/171, 220.1; 712/209, 225; 717/9, 4; 703/26

(56) References Cited

U.S. PATENT DOCUMENTS

| | | | | |
|---|---|---|---|---|
| 5,367,648 | * | 11/1994 | Chuang et al. ...................... | 712/225 |
| 5,539,899 | * | 7/1996 | Huynh et al. ........................ | 711/171 |
| 5,860,076 | * | 1/1999 | Greene et al. ........................... | 711/1 |
| 5,870,575 | * | 2/1999 | Kahle et al. ........................ | 712/209 |
| 5,956,495 | * | 9/1999 | Kahle et al. ............................ | 703/26 |
| 6,023,750 | * | 2/2000 | Hansen et al. ....................... | 711/220 |

* cited by examiner

Primary Examiner—Mark R. Powell
Assistant Examiner—Hoang-Vu Antony Nguyen-Ba
(74) Attorney, Agent, or Firm—Skjerven Morrill MacPherson LLP; Edward C. Kwok

(57) ABSTRACT

The present invention provides an interpreter with reduced memory access and improved jump-through-register handling. In one embodiment, a method includes storing a handler for a bytecode in a cell of a predetermined size of a table, and generating an address of the handler for the bytecode using a shift and an ADD operation. In particular, the handler address is generated by adding a base address of the table and an offset into the table. In another embodiment, a method includes prefetching a target handler address for providing improved jump-through-register handling.

15 Claims, 10 Drawing Sheets

```
// We use the following variables (stored in registers) in these code
// snippets:
//
// rJPCPlus1 stores (on entry to a bytecode handler) the value of the
// byte that sequentially follows the bytecode being handled shifted
// left by SHIFT_AMOUNT bits. The shift is done to enable the add.32
// that is at the entry of each handler to directly compute the address
// of the next bytecode handler.
//
// rJPCPlus 2 stores (on entry to a bytecode handler) the value of the
// byte that is the second byte that sequentially follows the bytecode
// being handled shifted left by SHIFT_AMOUNT bits. The shift is done
// to enable the add.32 that is at the entry of each handler to directly
// compute the address of the next bytecode handler.
//
// rJPC is the address (on entry to a bytecode handler) of the byte that
// is the second byte that sequentially follows the bytecode being handled.
//
// Here's a graphic representation of rJPC, rJPCPlus1, rJPCPlus 2
//
// address      value
// (in bytes)
//    100        10
//    101        20
//    102        30
//    103        40
//
// If we're processing the byte at address 100:
// rJPC = 102
// rJPCPlus1 = (20 << SHIFT_AMOUNT) [the 20 comes from address 101]
// rJPCPlus2 = (30 << SHIFT_AMOUNT) [the 30 comes from address 102]
//
// SHIFT_AMOUNT is a constant that is determined by the number of bytes
// allocated for each opcode handler. For instance, if 64 bytes are allocated
// for each opcode handler in each state (0-cached, 1-cached, etc), then
// SHIFT_AMOUNT is 6 (2^6 == 64)
//
// rTOS is the address of the top of the operand stack in memory.
// rCache0 is the register containing the 0th element of the operand stack cache
// rCache1 is the register containing the 1st element of the operand stack cache
// rCache2 is the register containing the 2nd element of the operand stack cache
//
// r6 is the special register that, when written to, preps the branch predictor
// to prepare to branch to this address.

//
// rSwitchBase 0 is the address of the table of opcode handlers with the state
// "0 items in stack cache"
//
// rSwitchBase1 is the address of the table of opcode handlers with the state
// "1 items in stack cache"
//
// rSwitchBase2 is the address of the table of opcode handlers with the state
// "2 items in stack cache"

iadd_0cached:
    add.32   r6, rJPCPlus1, rSwitchBase1   // This is a 1-byte opcode, so the next
                                           // bytecode follow immediately
    or.32    rJPCPlus1, rJPCPlus2, r0      // Move rJPCPlus2 to rJPCPlus1
    lda.8    rJPCPlus2, (+rJPC)            // auto-increment load from (rJPC)

lda.32   rTMP3, (rTOS-)                // load the two values and add them,
    lda.32   rTMP4, (rTOS-)                // placing the result in the stack
    add.32   rCache0, rTMP3, rTMP4         // cache in register rCache 0 shl.32   rJPCPlus2, rJPCPlus2, SHIFT_AMOUNT  // Shift the value in
                                                 // rJPCPlus2 as required
    jr       r6                            // jump to next bytecode handler iadd_1cached:
    add.32   r6, rJPCPlus1, rSwitchBase1   // This is a 1-byte opcode, so the next
                                           // bytecode follow immediately
    or.32    rJPCPlus1, rJPCPlus2, r0      // Move rJPCPlus2 to rJPCPlus1
    lda.8    rJPCPlus2, (+rJPC)            // auto-increment load from (rJPC)

lda.32   rTMP3, (rTOS-)                // load the one value not in the stack
    add.32   rCache0, rTMP3, rCache0       // cache and add it to the value in
                                           // rCache0, writing it back to rCache0 shl.32   rJPCPlus2, rJPCPlus2, SHIFT_AMOUNT  // Shift the value in
                                                 // rJPCPlus2 as required
    jr       r6                            // jump to next bytecode handler iadd_2cached:
    add.32   r6, rJPCPlus1, rSwitchBase1   // This is a 1-byte opcode, so the next
                                           // bytecode follow immediately
    or.32    rJPCPlus1, rJPCPlus2, r0      // Move rJPCPlus2 to rJPCPlus1 lda.8    rJPCPlus2, (+rJPC)            // auto-increment load from (rJPC)
    add.32   rCache0, rCache0, rCache1     // Add both values (which are stored
                                           // in the stack cache at rCache0 and
                                           // rCache1), write result to rCache0
    shl.32   rJPCPlus2, rJPCPlus2, SHIFT_AMOUNT  // Shift the value in
                                                 // rJPCPlus2 as required
    jr       r6                            // jump to next bytecode handler
```

```
//
// Takes as input an array of strings that contains the program being compiled.
// Uses the append() method to append bytes to the -bytecode-.
// (bytecode is a Vector holding bytes).
//
public static void compile(String lines[]) {
    for (i = 0; i < lines.length. i++) {
        String command = firstWord(lines[i]);    // parse string and
                                                 // get command name.
        String argument = otherWords(lines[i]);  // get command parameters.

if (command.equals("puts")) {
            // output bytecode for the PUTS command
            bytecode.append(OPC_PUTS);

// now output the length of the string that follows puts
            // (in this interpreter, we don't have variables or expressions
            // yet - so this is very basic!)
            bytecode.append(argument.length);  // (string length must be < 256)
            // now output the bytes in the string...
            for (c = 0; c < argument.length; c++) { // bytes in string
                bytecode.append(argument[c]);
            }
        }
        //
        // many more cases go in here
        //
        else if (command.equals("exit")) {
            // output bytecode that tells the interpreter to return
            bytecode.append(OPC_EXIT);
        }
    }
}
```

FIG. 3

```
public static void execute(bytecode[ ]) {
    int pc = 0;    // my 'program counter'
    while (true) {
        int opcode = bytecode[pc];    // get an instruction (or 'opcode')
                                      // from bytecode
        switch (opcode) {             // and switch on its type
        case OPC_PUTS:  // Virtual Machine instruction to print a string // next byte is a length
            int len = bytecode[pc + 1];

// print out -len- bytes from the bytecode
            for (i = 1; i <= len; i++) { printChar (bytecode[pc + i]); }
            // force pc to advance to the next instruction in bytecode
            pc = pc + len + 1;
            break; // done // many more cases ...

case OPC_EXIT:  // return from program
            return;
        }
    }
}
```

FIG. 4

```
void interpret (unsigned char *bytecodes)
{
    StackFrame frame;   /* the stack frame for the method */

/* setup the registers ... */ unsigned char *pc  = bytecodes;
    Item *optop        = frame.operand_stack;
    Item *vars         = frame.local_variables;

while (1) { unsigned char opcode = *pc; /* get current instruction */ switch (opcode) {/* switch on current instruction */ case OPCODE_dup: /* duplicate item on stack */
                optop[0] = optop[-1];

/* update registers */
                pc += 1; optop -= 1;
                continue;

case OPCODE_pop: /* remove item from stack */
                pc += 1; optop -= 1;
                continue;

case OPCODE_iadd: /* add two items on the stack */

...

case OPCODE_return: /* return from method */
                return;
        }
    }
}
```

FIG. 5

FIG. 7 table_offset := code << 6;   // 64 = $2^6$
handler_address := table_base + table_offset;

FIG. 8

```
// Bytecode stream: 03 3b 84 00 01 1a 05 68 3b a7 ff f9
// Disassembly:
// Method void doMathForever( )
// Left column: offset of instruction from start of method
//  |      Center column: instruction mnemonic and any operands
//  |       |            Right column: comment
   0    iconst_0        // 03
   1    istore_0        // 3b
   2    iinc 0, 1       // 84 00 01
   5    iload_0         // 1a
   6    iconst_2        // 05
   7    imul            // 68
   8    istore_0        // 3b
   9    goto 2          // a7 ff f9
```

| byte 0 | bytes 1-2 | byte 3 | byte 4 | byte 5 | bytes 6-7 |
|--------|-----------|--------|--------|--------|-----------|
| op0    | op1 arg1  | op2    | op3    | op4    | op5       |

FIG. 9

| Orig State | New State |
|------------|-----------|
| 0 | 1* |
| 1 | 1* |
| 2 | 1  |
| 3 | 2  |

FIG. 13 op0 handler:
    next_handler_addr := select handler addr for byte 1
    // we don't need to update prefetch_1 since that just holds op1
    prefetch_1 := prefetch of byte 2
    calculate handler addr for byte 2
    calculate handler addr for byte 3
    ... do work for op0 ...
    jr next_handler_addr    // this takes us to op1 handler op1 handler:
    next_handler_addr := select handler addr for byte 3
    prefetch_1 := prefetch of byte 4
    calculate handler addr for byte 4
    calculate handler addr for byte 5
    ... do work for op1 ...
    jr next_handler_addr    // this takes us to op2 handler op2 handler:
    next_handler_addr := select handler addr for byte 4
    prefetch_2 := prefetch of byte 5
    calculate handler addr for byte 5
    calculate handler addr for byte 6
    ... do work for op2 ...
    jr next_handler_addr    // this takes us to op3 handler

```
// We use the following variables (stored in registers) in these code
// snippets:
//
// rJPCPlus1 stores (on entry to a bytecode handler) the value of the
// byte that sequentially follows the bytecode being handled shifted
// left by SHIFT_AMOUNT bits. The shift is done to enable the add.32
// that is at the entry of each handler to directly compute the address
// of the next bytecode handler.
//
// rJPCPlus 2 stores (on entry to a bytecode handler) the value of the
// byte that is the second byte that sequentially follows the bytecode
// being handled shifted left by SHIFT_AMOUNT bits. The shift is done
// to enable the add.32 that is at the entry of each handler to directly
// compute the address of the next bytecode handler.
//
// rJPC is the address (on entry to a bytecode handler) of the byte that
// is the second byte that sequentially follows the bytecode being handled.
//
// Here's a graphic representation of rJPC, rJPCPlus1, rJPCPlus 2
//
// address     value
// (in bytes)
//   100         10
//   101         20
//   102         30
//   103         40
//
// If we're processing the byte at address 100:
// rJPC = 102
// rJPCPlus1 = (20 << SHIFT_AMOUNT) [the 20 comes from address 101]
// rJPCPlus2 = (30 << SHIFT_AMOUNT) [the 30 comes from address 102]
//
// SHIFT_AMOUNT is a constant that is determined by the number of bytes
// allocated for each opcode handler. For instance, if 64 bytes are allocated
// for each opcode handler in each state (0-cached, 1-cached, etc), then
// SHIFT_AMOUNT is 6 (2^6 == 64)
//
// rTOS is the address of the top of the operand stack in memory.
// rCache0 is the register containing the 0th element of the operand stack cache
// rCache1 is the register containing the 1st element of the operand stack cache
// rCache2 is the register containing the 2nd element of the operand stack cache
//
// r6 is the special register that, when written to, preps the branch predictor
// to prepare to branch to this address.
```

FIG. 14A

//
// rSwitchBase 0 is the address of the table of opcode handlers with the state
// "0 items in stack cache"
//
// rSwitchBase1 is the address of the table of opcode handlers with the state
// "1 items in stack cache"
//
// rSwitchBase2 is the address of the table of opcode handlers with the state
// "2 items in stack cache"

iadd_0cached:
    add.32    r6, rJPCPlus1, rSwitchBase1  // This is a 1-byte opcode, so the next
                                                       // bytecode follow immediately
    or.32     rJPCPlus1, rJPCPlus2, r0  // Move rJPCPlus2 to rJPCPlus1
    lda.8     rJPCPlus2, (+rJPC)     // auto-increment load from (rJPC)

lda.32    rTMP3, (rTOS-)         // load the two values and add them,
    lda.32    rTMP4, (rTOS-)         // placing the result in the stack
    add.32    rCache0, rTMP3, rTMP4     // cache in register rCache 0 shl.32    rJPCPlus2, rJPCPlus2, SHIFT_AMOUNT  // Shift the value in
                                                            // rJPCPlus2 as required
    jr        r6                                 // jump to next bytecode handler iadd_1cached:
    add.32    r6, rJPCPlus1, rSwitchBase1  // This is a 1-byte opcode, so the next
                                                        // bytecode follow immediately
    or.32     rJPCPlus1, rJPCPlus2, r0  // Move rJPCPlus2 to rJPCPlus1
    lda.8     rJPCPlus2, (+rJPC)     // auto-increment load from (rJPC)

lda.32    rTMP3, (rTOS-)         // load the one value not in the stack
    add.32    rCache0, rTMP3, rCache0    // cache and add it to the value in
                                                         // rCache0, writing it back to rCache0 shl.32    rJPCPlus2, rJPCPlus2, SHIFT_AMOUNT  // Shift the value in
                                                             // rJPCPlus2 as required
    jr        r6                                 // jump to next bytecode handler iadd_2cached:
    add.32    r6, rJPCPlus1, rSwitchBase1  // This is a 1-byte opcode, so the next
                                                        // bytecode follow immediately
    or.32     rJPCPlus1, rJPCPlus2, r0  // Move rJPCPlus2 to rJPCPlus1

FIG. 14B lda.8    rJPCPlus2, (+rJPC)        // auto-increment load from (rJPC)

add.32   rCache0, rCache0, rCache1   // Add both values (which are stored
                                     // in the stack cache at rCache0 and
                                     // rCache1), write result to rCache0 shl.32   rJPCPlus2, rJPCPlus2, SHIFT_AMOUNT  // Shift the value in
                                              // rJPCPlus2 as required
jr       r6                         // jump to next bytecode handler

FIG. 14C table_offset := code << 6;   // $64 = 2^6$
handler_address := $r_{base1}$ + table_offset; // since new state is 1

FIG. 15

INTERPRETER WITH REDUCED MEMORY ACCESS AND IMPROVED JUMP-THROUGH-REGISTER HANDLING

FIELD OF THE INVENTION

The present invention relates generally to interpreters and, more particularly, to an interpreter with reduced memory access and improved jump-through-register handling.

BACKGROUND OF THE INVENTION

Computer programs are typically written in source code that must be translated into a native machine code so that the translated native machine code can be executed by a computer. For example, Java™ technology uses both compilation and interpretation. Compilation is a process of translating computer code from one language to another language, and storing the results of that translation for later execution on a computer. Many well-known programming languages such as C, Pascal, and Fortran are usually compiled straight from source code to native machine code (i.e., native instructions of a microprocessor). In contrast, the Java™ programming language is typically compiled into Java™ class files, which contain architecture-independent instructions for the well-known Java™ Virtual Machine (e.g., Sun Microsystems, Inc., provides a commercially available package called the Java™ Development Kit (JDK) 1.0.2 and 1.1).

An interpreter is a program which performs the actions as directed by the source code or intermediate code (e.g., Java™ bytecode), at run time. Thus, interpretation involves translating code from one language to another language except that the translation is directly executed instead of stored for later execution. Languages (or language families) such as Lisp and Basic are typically interpreted straight from source code to native machine code. In contrast, in standard Java™ implementations, the interpreter interprets from the Java™ class files. In particular, Java™ Virtual Machine instructions (e.g., Java™ bytecodes), which were compiled from source code, are interpreted by a Java™ interpreter. Thus, the compiled source code is converted on the fly into native machine code, which is then executed rather than stored.

Interpreting Java™ Virtual Machine instructions is common on existing implementations of the Java™ Virtual Machine, but is not required by either the Java™ Language Specification or the Java™ Virtual Machine Specification. A Java™ Virtual Machine implementation can also use Just-In-Time (JIT) compilation: translating Java™ source code into native machine code at run time on the local platform and then executing the translated (stored) native machine code. Further, another approach is to have hardware such as a microprocessor that directly implements the Java™ Virtual Machine instruction set so that the microprocessor executes Java™ bytecodes directly.

SUMMARY OF THE INVENTION

The present invention provides an interpreter with reduced memory access and improved jump-through-register handling. For example, the present invention provides a cost-effective and high performance apparatus and method for an interpreter such as a Java™ interpreter that provides reduced memory access and improved jump-through-register handling.

In one embodiment, a method includes storing handlers in cells of a predetermined size in a table, and generating an address of a first handler by adding a table base address and a first table offset thereby eliminating the need for a memory access to generate the address of the bytecode handler. In particular, the table base address is the starting address of the table. The first table offset is the offset into the table for the first handler.

In one embodiment, the method includes storing bytecode handlers in power of two size cells, such as 64 byte cells. Also, generating the address of a particular bytecode handler is efficiently implemented as a shift operation and an add operation. Accordingly, on modern microprocessors on which memory accesses are costly from a performance standpoint, this embodiment provides improved interpreter performance by reducing memory access during interpretation.

In one embodiment, a method includes executing a first handler, and speculatively computing a first target and a second target for a second handler while executing the first handler. In particular, this allows for providing a hint to a branch unit of a microprocessor to indicate the location for the next branch address before executing the next branch. In one embodiment, the hint is provided to the branch unit using a register to store the speculatively computed target address.

In one embodiment, the method speculatively computes the first target and the second target in order to provide a hint to the branch unit about a destination of an approaching jump-through-register for a Java™ interpreter. In particular, the speculative computation is based on an empirical observation that the distribution of bytecode lengths for Java™ bytecodes is typically one or two bytes long for each bytecode. Further, the speculative computation can be performed efficiently using the above described generation of addresses for bytecode handlers, which reduces memory accesses during bytecode interpretation. Accordingly, this embodiment improves jump-through-register handling for a Java™ interpreter.

Other aspects and advantages of the present invention will become apparent from the following detailed description and accompanying drawings.

BRIEF DESCRIPTION OF THE DRAWINGS

FIG. 3 provides a bytecode compiler written in pseudocode.

FIG. 4 provides a bytecode interpreter for a virtual machine written in pseudocode.

FIG. 5 provides a Java™ interpreter written in standard "C" code.

FIG. 7 provides pseudocode for generating a bytecode handler address in accordance with one embodiment of the present invention.

FIG. 8 provides an example JAVA™ bytecode stream.

FIG. 9 is a functional diagram of a bytecode stream in accordance with one embodiment of the present invention.

FIG. 11 provides pseudocode for an interpreter with improved jump-through-register handling in accordance with one embodiment of the present invention.

FIG. 12 is a functional diagram that provides a graphical depiction of the state of the local variables and the operand stack while executing a bytecode stream.

FIG. 13 is a state diagram of a multi-state interpreter in accordance with one embodiment of the present invention.

FIGS. 14A–14C provide pseudocode for bytecode handlers for each state of a multi-state interpreter for an "iadd" Java™ bytecode in accordance with one embodiment of the present invention.

FIG. 15 provides pseudocode for address generation of a handler for a multi-state interpreter in accordance with one embodiment of the present invention.

DETAILED DESCRIPTION OF THE INVENTION

The present invention provides an interpreter with reduced memory access and improved jump-through-register handling. For example, the present invention is particularly advantageous for an interpreter that requires a high performance as well as a cost-effective implementation.

Generally, virtual machines advantageously provide portability of computer software (e.g., computer programs) across multiple platforms (e.g., microprocessor instruction sets and operating systems). For example, Java™ promises portability across platforms by extending the concept of encapsulation to the concept of the platform. In particular, the Java™ technology encapsulates computer and its operating system inside an abstract Java™ Virtual Machine (VM). A description of the Java™ language specification, version 1.0 and 1.1, is provided by Sun Microsystems, Inc., in a book entitled *The Java Language Specification* written by James Gosling, Bill Joy, and Guy Steele and published by Addison-Wesley. Also, a description of the Java™ Virtual Machine, version 1.0 and 1.1, is provided by Sun Microsystems, Inc., in a book entitled *Java Virtual Machine Specification* written by Tim Lindholm and Frank Yellin and published by Addison-Wesley.

The Java™ Virtual Machine enables programmers to obtain system-level services like process management and graphics, but the Java™ Virtual Machine avoids dependency on any particular operating system by using generic Java™ class libraries designed for such tasks. Accordingly, this enables programmers to avoid dependence on a particular processor or operating system by using Java™ bytecodes, an intermediate language as defined in the Java™ VM specification that can be interpreted by a Java™ interpreter.

Figure 1:
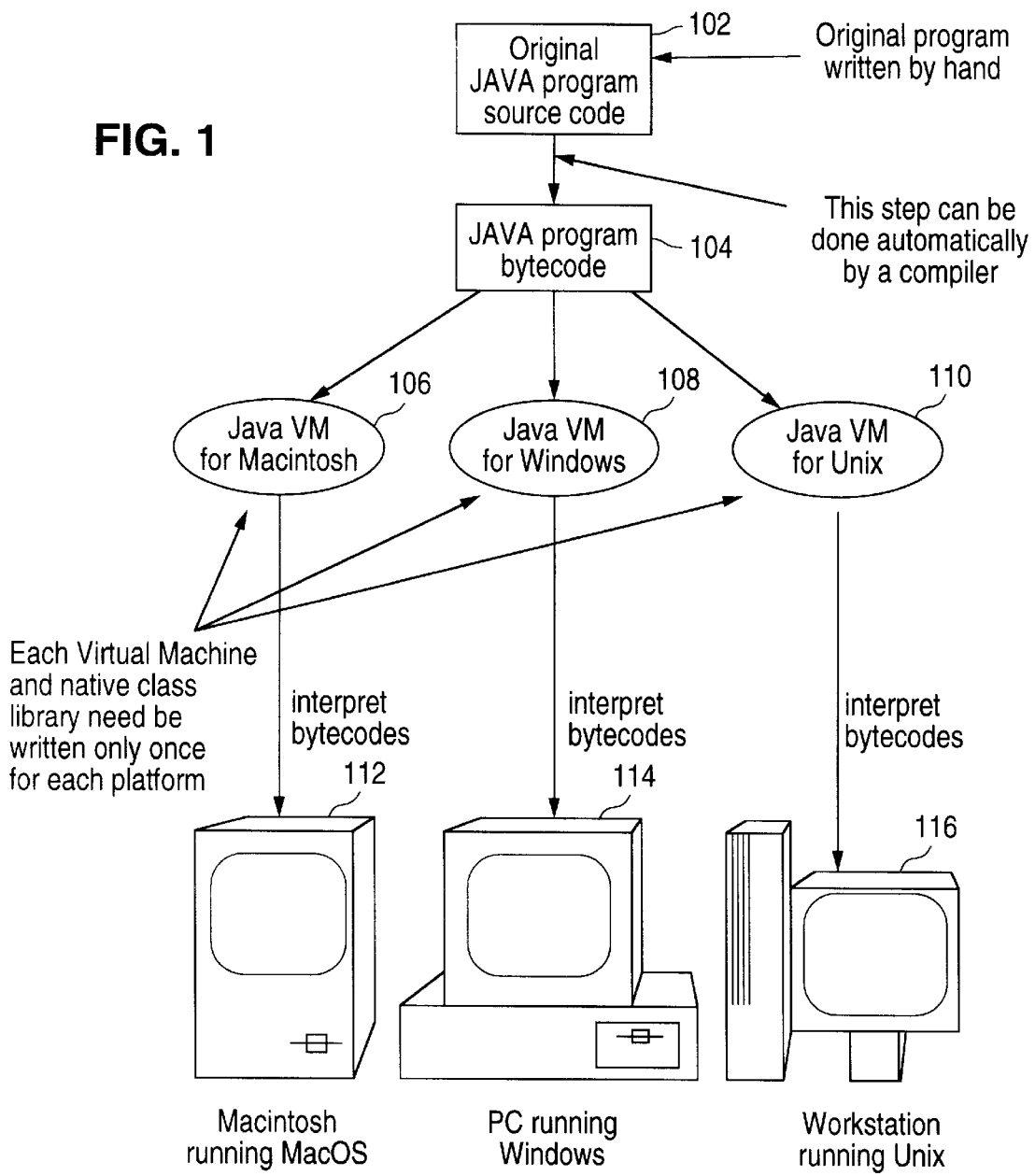
FIG. 1 is a functional diagram of a Java™ computing environment in accordance with one embodiment of the present invention.

FIG. 1 is a functional diagram of a Java™ computing environment in accordance with one embodiment of the present invention. In particular, an original Java™ program source code 102 is prepared by a computer programmer. Instead of generating machine-specific or operating-system-specific instructions (e.g., native instructions for a particular machine or library calls for a particular OS), a Java™ compiler compiles Java™ program source code 102 into a Java™ program bytecode 104. However, a general microprocessor such as the well-known Intel X86/Pentium™ (e.g., in a PC 114) cannot execute Java™ program bytecode 104 directly (i.e., without interpretation or further compilation). Thus, a run time implementation of a Java™ VM for a particular processor and a particular operating system (OS) is provided. For example, a Java™ VM for Macintosh™ 106 is provided for an Apple Macintosh™ computer running a MAC OS™ 112. A Java™ VM for Windows™ 108 is provided for a PC (Personal Computer) (e.g., a Hewlett Packard Vectra™) running Microsoft Windows™ 114. A Java™ VM for Unix 110 is provided for a workstation (e.g., an HP 9000™ workstation) running Unix™ (e.g., HP-UX™) 116. Accordingly, each VM 106, 108, and 110 and native class library need be written only once for each platform 112, 114, and 116. In particular, a Java™ interpreter in the run-time system interprets the Java™ bytecodes of Java™ program bytecode 104 and executes instructions native to the platform.

Because Java™ bytecodes are not specific to any particular processor or operating system, Java™ program bytecode 104 is advantageously fully portable. Thus, machines as diverse as a machine running Apple MAC OS™, a machine running Microsoft Windows 95™, and a machine running HP-UX™ can use exactly the same Java™ bytecodes, and thus, they can execute software that originates from the same source code 102. However, a typical run-time interpretation of Java™ bytecodes adds significant overhead from a performance standpoint.

Java™ run-time systems are commercially available for most popular microprocessors. Any Java™ program source code 102 can be compiled/interpreted and run unaltered on the Java™ run-time systems 112, 114, and 116 (assuming that the Java™ run-time system implementations 112, 114, and 116 and the Java™ program source code 102 satisfy the appropriate standard Java™ language specification and Java™ Virtual Machine specification, respectively).

The Java™ technology also provides platform independence in an internet environment. For example, a Java™ applet (e.g., a Java™ program bytecode 104) stored on a World Wide Web (WWW) server can be downloaded to a user's machine. In particular, a WWW browser (e.g., Netscape Navigator™) executing on the user's machine (e.g., a workstation, a PC, a network computer (NC), an Apple Macintosh™, a WWW browser console, a cellular phone, a laptop computer, or a handheld computer) downloads the Java™ applet. A Java™ interpreter executing on the user's machine interprets and executes the downloaded Java™ applet. For example, various versions of WWW browsers such as Netscape Navigator™ and Microsoft Internet Explorer™ have included a Java™ interpreter. Also, a Java™ VM is currently provided in a commercially available Java™ Development Kit (JDK) 1.1 from Sun Microsystems, Inc.

Thus, the Java™ technology provides a programming language that can be compiled and then interpreted to provide platform independence, which advantageously allows for portability of Java™ program source code 102. In contrast, many modern languages are fully compiled. For example, a C++ compiler translates or compiles a C++ program source code, which represents instructions a computer programmer writes in C++, into native instructions for a particular platform (e.g., the native code of a particular microprocessor and calls to the native libraries of a particular OS). The particular platform can then execute the fully-compiled program without requiring further translation. On the other hand, unlike the Java™ technology, the fully-compiled program that is now in executable form for the particular platform, only runs on that particular platform. Hence, software developers must rewrite call to the native libraries for a different OS and use a different compiler to provide a different fully-compiled program for a different target platform. Accordingly, C++ source code may be portable (assuming compilers exist for programming language of the source code for the different platforms such as platforms 112, 114, and 116), but executable code generally is not portable.

Thus, a Java™ compiler generally does not target a particular platform, because the target is not a real machine, but rather the Java™ Virtual Machine. Thus, the Java™ compiler translates Java™ program source code 102 into Java™ program bytecode 104, which represents a set of compact bytecode instructions. Each time the Java™ program is executed or run, a Java™ interpreter interprets each instruction of Java™ program bytecode 104 and executes instructions native to the particular platform 112, 114 or 116.

Generally, a Java™ Virtual Machine implementation includes an execution engine. In the standard Java™ Virtual Machine specification, the behavior of the execution engine is defined in terms of the bytecode instruction set. For each instruction, the Java™ Virtual Machine specification describes in detail the effects and side-effects a Java™ Virtual Machine implementation should create, but does not define at the implementation level, how such an instruction should be executed. Accordingly, an execution engine can be implemented to execute bytecodes in various manners and still be consistent with the Java™ Virtual Machine specification. For example, the implementations can interpret, just-in-time (JIT) compile, execute natively in silicon (e.g., a Java™-chip), or use a combination of these approaches.

In particular, each thread of a running or executing Java™ application or program is a distinct instance of the Java™ Virtual Machine's execution engine. From the beginning of the execution of the Java™ application or program to the end, a thread is either executing bytecodes or native methods (i.e., methods implemented in a language other than Java such that it does not need to be interpreted). A thread may execute bytecodes directly, by interpreting, executing natively in silicon (e.g., a Java™ chip), or indirectly, or by JIT compiling and executing the resulting native code. Thus, all threads that belong to the running Java™ application, represent execution engines in action.

A Java™ interpreter generally is not platform independent. But for a given platform, creating a Java™ VM implementation that will interpret and execute a Java™ program bytecode 104 is generally preferable to re-implementing every application (e.g., writing a new program source code for each target platform). Accordingly, this flexibility makes cross-platform development much easier and less expensive, but at a possibly significant cost, because bytecode interpretation typically causes Java™ programs to execute on a platform much slower than a fully-compiled program executing on the platform such as a fully-compiled C++ computer program executing on platform 114. Moreover, this performance degradation is typically a problem for any interpreted program.

One approach to improving interpreter performance such as for a Java™ interpreter is to provide a Java™-specific microprocessor. For example, a Java™-specific microprocessor that can execute Java™ bytecode directly could be provided. In other words, the Java™ bytecode essentially represents the native machine code (e.g., a subset of the native instruction set) of the Java™-specific microprocessor. As a result, the Java™-specific microprocessor may significantly eliminate the overhead of the second translation step, the interpretation of Java™ bytecodes. Thus, a Java™ chip or Java™-specific microprocessor essentially dispenses with the Java™ Virtual Machine, implemented as either the Java™ JIT compiler or the Java™ interpreter, and could conceivably increase execution speeds of Java™ program bytecode.

However, limitations inherent in current microprocessor technology may constrain significant performance increases that can realistically be expected from a Java™ chip. Further, to achieve a significantly greater gains, a Java™ chip will most likely be difficult and expensive to develop. Moreover, general-purpose microprocessors may be preferred over a Java™-specific microprocessor. For example, general-purpose microprocessors provide significant flexibility as they run software written in almost every popular language. In contrast, a Java™ chip will likely only run Java™ bytecode efficiently, practically limiting a user's choices to programs written in Java™. Moreover, non-Java™ chip-based platforms would still require interpretation of Java™ program bytecodes. Accordingly, in one embodiment, the present invention provides an improved Java™ interpreter as further discussed below.

Figure 2:
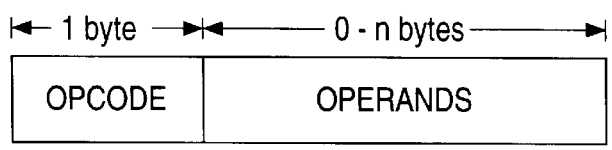
FIG. 2 is a block diagram of a Java™ bytecode in accordance with one embodiment of the present invention.

FIG. 2 is a block diagram of a Java™ bytecode. In particular, a bytecode stream is a sequence of instructions for the Java™ VM. Each bytecode includes a one-byte or two-byte opcode followed by zero or more operands that require zero to n bytes. The opcode indicates the operation to be performed. Operands supply information needed to perform the operations specified by the opcode. The opcode itself indicates whether it is followed by operands, and the form the operands (if any) take. Many Java™ bytecodes, which are Java™ VM instructions, require no operands and therefore include only an opcode, which requires just one byte. Depending on the opcode, the Java™ VM may refer to data stored in other areas such as a Java™ stack, which is further discussed below, in addition to or instead of operands that trail the opcode.

In particular, the 1-byte opcode of FIG. 2 represents a number that the Java™ virtual machine interprets as a specific instruction. For example, Java™ opcode value 104 (0X68 in hexadecimal representation) represents the instruction to multiply two integer values, and instructs the Java™ Virtual Machine to take the top two values off the Java™ operand stack, multiply them, and push the product back onto the stack. In addition to its numerical value, each opcode has a conventional short name, called its mnemonic. For example, the mnemonic for opcode 104 is "imul". A Java™ VM also uses the opcode to determine just how many following bytes are operands for that opcode. In some cases, such as the "imul" instruction, the imul's opcode which is just one byte represents the entire instruction as no operands are needed. In other cases, an opcode may require one or more operands. For example, the FLOAD instruction (opcode value 23 or 0X17 in hexadecimal) loads an FLOAD value from a local variable, and it uses an index operand to specify which local variable to load from. If the local variable of interest is at index 5, then the instruction would require two bytes written out as "23 5" (FLOAD from local variable at index 5).

In one embodiment, the Java™ VM execution engine runs by executing bytecodes one instruction at a time. This process takes place for each thread (execution engine instance) of the Java™ application running in the Java™ VM. In particular, the execution engine fetches an opcode of a bytecode stream of Java™ program bytecode 104, and if the opcode has operands, then the execution engine fetches the operands. The execution engine performs the action requested by the opcode using its operands, if any, and then fetches a next opcode of the bytecode stream. Execution of bytecodes continues until a thread completes either by returning from its starting method or by not catching a thrown exception.

In one embodiment, a critical responsibility of an interpreter (e.g., a Java™ interpreter) is determining a next instruction to execute. For example, a Java™ interpreter can generally determine a next bytecode to fetch in one of three ways. For many instructions, the next bytecode to execute directly follows the current bytecode in the bytecode stream. For some instructions, such as goto or return, the interpreter determines the next bytecode as part of its execution of a current instruction. If an instruction throws an exception, the interpreter determines the next opcode to fetch by searching for an appropriate catch clause.

Thus, the Java™ technology is an example of an interpreted computer language. With interpreted computer languages, applications or programs written in the interpreted language typically involve two steps in order to execute the program.

In the first step, the program text is parsed, some analysis is performed, and the virtual machine instructions that are needed to execute the program are generated. This information is then output in an efficient data representation such as compact bytecode. Accordingly, the compilation step is performed once before running the program, either dynamically as in the case of the well known SmallTalk™ computer language, or as a separate process using a stand-alone batch compiler as in the typical case of Java™. Often, byte-based representations are used and hence the name bytecode is used to refer to the compiled instructions for the virtual machine. For example, FIG. 3 provides a bytecode compiler written in pseudocode. However, other representations can also be used, which are often called P-code (Program code) representations.

In the second step, an interpreter iterates over the data (e.g., bytecode or P-code) produced by the first step, executing the compiled virtual machine instructions. For example, FIG. 4 provides a bytecode interpreter for a virtual machine written in pseudocode. In particular, the bytecode interpreter of FIG. 4 steps through each bytecode in a bytecode stream, determines which instruction (e.g., opcode) the bytecode represents, processes (when required) additional data from the bytecode (e.g., operands, or other data), and then carries out the action required by the instruction. Each time an instruction is executed, a PC (Program Counter, which is an index keeping track of where the interpreter is within the bytecode stream) is updated to point to a next instruction. The interpreter of FIG. 4 is similar to Sun Microsystem's initial Java™ interpreter.

Computer programming languages based on bytecode or P-code interpreters (also called semi-compiled languages, because they are basically intermediate in form between fully interpreted and fully compiled languages) can be much faster than fully interpreted languages. But execution of an interpreted language program such as a Java™ program bytecode 104 is typically in the range of 10 to 20 times slower than execution of a fully-compiled "C++" program. Accordingly, in one embodiment, an interpreter with improved performance is provided as further discussed below.

FIG. 5 provides a Java™ interpreter written in standard "C" code. As discussed above, the core of any Java™ VM implementation is the execution engine, that is, the interpreter that executes the instructions in the bytecodes of a method of Java™ program bytecode 104. Java™ interpreters such as the Java™ interpreter shown in FIG. 5 executes the Java™ bytecodes instruction by instruction in a method. A few state variables are provided for storing the current program counter (PC), the top of the stack (OPTOP), the class of the method that is being executing, and pointers to storage for local variables (VARS) and the stack frame. As shown in FIG. 5, a simple way to implement a Java™ interpreter is by using the "switch" statement in the standard "C" programming language.

However, the Java™ interpreter written in C code as shown in FIG. 5 is inefficient when the C code is compiled and then executed on most modern microprocessors such as the Intel Pentium™ microprocessor. In particular, in the "switch" statement written in C code as in the Java™ interpreter of FIG. 5, a lookup table that stores a pointer to a handler for each opcode. Thus, the Java™ interpreter of FIG. 5 performs a memory access to look up the address of the table, loads an address from the table (another memory access) corresponding to the required handler and then jumps to the loaded address. Thus, two memory accesses are performed in order to locate the handler for executing an interpreted bytecode. This extra memory access is prohibitive from a performance standpoint, especially on modern microprocessors in which a memory access is a significant penalty from a performance standpoint. Hence, the problem with the typical interpreter is that several memory accesses are typically needed to begin execution of a handler for a given bytecode or P-code.

Figures 6, 10:
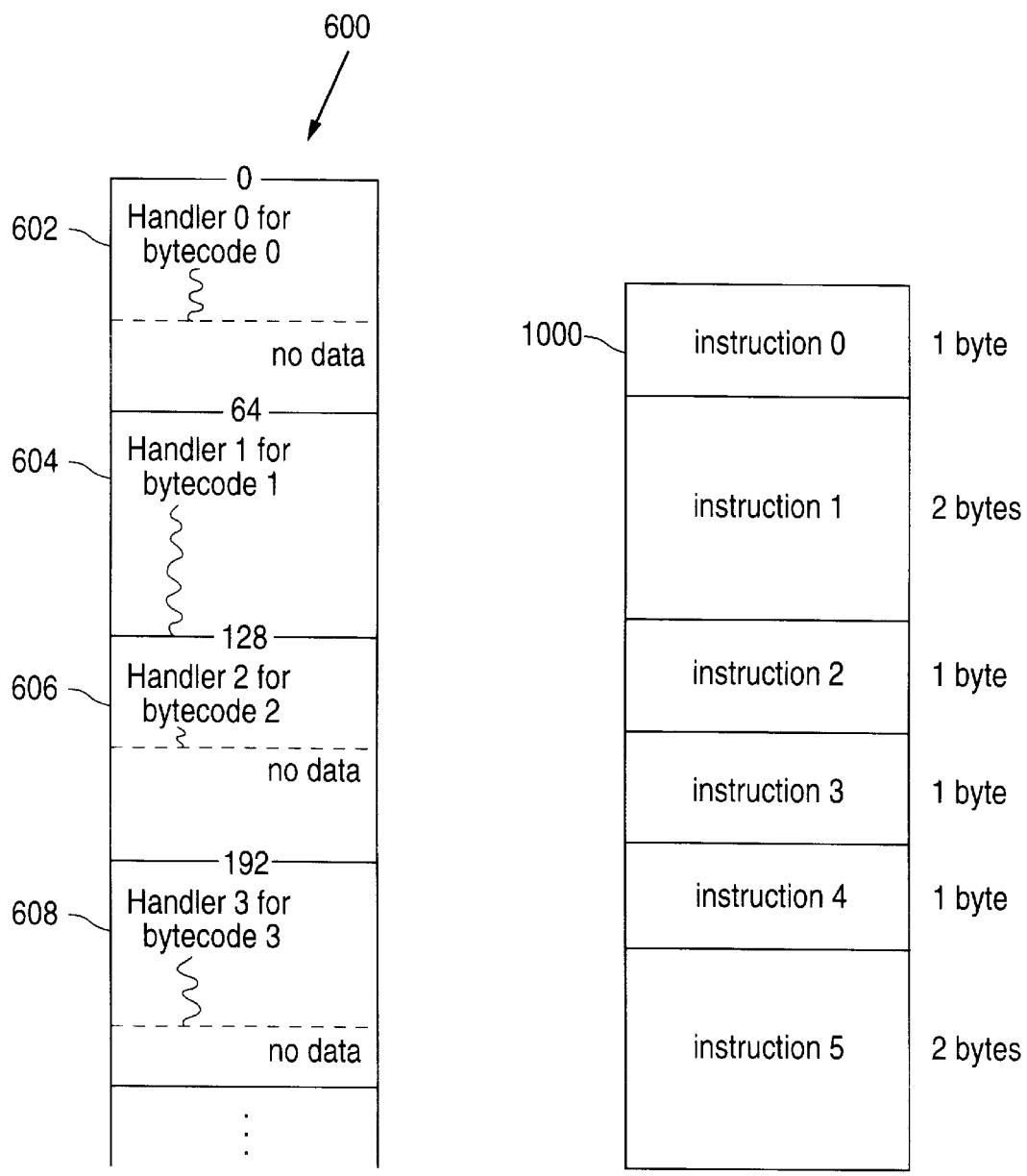
FIG. 6 is a block diagram of a table of cells for bytecode handlers stored in a memory of a computer in accordance with one embodiment of the present invention.
FIG. 10 is a block diagram of a memory such as a computer memory storing the bytecode stream of FIG. 9 in accordance with one embodiment of the present invention.

Accordingly, in one embodiment, a Java™ interpreter with improved performance is provided, and several memory accesses are typically needed to begin execution of a handler for a given bytecode or P-code. FIG. 6 is a block diagram of a table 600 of cells 602, 604, 606, and 608 for bytecode handlers stored in a memory of a computer in accordance with one embodiment of the present invention. In particular, when interpreting Java™ bytecodes, the interpreter jumps only on one of 256 different opcodes (assuming an implementation compliant with the standard Java™ VM specification, which defines 256 different bytecodes). Thus, 256 different bytecode handlers, which are executable code segments for a particular platform such as platform 112, 114, or 116, are stored in a memory of a computer. When interpreting a Java™ bytecode stream, the interpreter jumps to the storage location of the executable code segment for the bytecode handler of a particular bytecode.

In particular, these executable code segments for the handlers of Java™ bytecodes are typically relatively small. Thus, as shown in FIG. 6, a memory of a computer can be allocated such that table 600 is provided with cells 602, 604, 606, and 608, which are each a power of two size, such as 64 byte segments. Each bytecode handler for the 256 different bytecodes is stored in a different 64-byte cell of table 600. Thus, the bytecode handlers for each bytecode are laid out in a table in which each handler occupies a fixed amount of space (e.g., less than or equal to 64 bytes), and thus the bytecode handlers can be stored in cells, which size is allocated to be a power of two (base two). Such cell size is convenient, because memory addresses for these cells can be easily calculated. In FIG. 6, bytecode handler 0 is stored in cell 602, which is a 64-byte cell. Handler 0 may not require 64 bytes, and thus, the allocated 64-byte cell 602 includes a portion of the cell that stores no data. However, handler 1 is stored in cell 604 and handler 1 requires the entire 64-byte cell 604. If a handler requires more than 64 bytes of storage space, then the handler can jump to space outside the cell and then return to the cell if necessary. Alternatively, any fixed value can be used to define the size of cells 602, 604, 606, and 608 of table 600.

As a result, instead of looking up in a lookup table for the handler address and then jumping to that handler address, the interpreter can simply calculate the handler address. Specifically, the interpreter multiplies the bytecode value by the cell size (e.g., 64 bytes), and then add the table base address to that computed table offset (i.e., offset into the table). In particular, FIG. 7 provides pseudocode for generating a bytecode handler address in accordance with one embodiment of the present invention. In FIG. 7, because the cell size is a power of 2 (in this case 64), the offset of the required handler from the beginning of the table is easily calculated by a simple left-shift operation. The bytecode handler address is then computed by simply adding the offset to a table base address, which is stored in a register of the microprocessor. Accordingly, the interpreter can jump directly to the bytecode handler without incurring the cost of a single memory access.

Accordingly, this embodiment is advantageous, because it reduces memory accesses performed by the interpreter when executing a bytecode stream, and in particular, it reduces memory access when generating an address for a bytecode handler.

Moreover, this embodiment of the present invention is particularly advantageous for interpreting Java™ bytecode that includes, for example, "for" loops. Typically, in interpreting a "for" loop around a set of Java™ bytecodes, an interpreter first jumps to the base of the "for" statement in order to handle tasks such as incrementing the loop counter and checking bounds, and then jumps back to a "switch" statement to execute the bytecodes within the loop, as in the switch implementation of a Java™ interpreter as discussed above with respect to FIG. 5.

In one embodiment, a Java™ interpreter loads a next bytecode handler by directly computing the address of the bytecode handler for the next bytecode. The interpreter can then jump directly to the bytecode handler thereby eliminating one of the jumps that was typically required by a standard Java™ interpreter. accordingly, a Java™ interpreter in accordance with one embodiment of the present invention reduces the number of branches required per bytecode to essentially one branch per bytecode rather than two branches per bytecode. Moreover, because this path is executed for each Java™ bytecode within a "for" loop, this embodiment provides a Java™ interpreter with significantly improved performance.

In one embodiment, an interpreter with reduced memory access is hand-coded in assembly language. In particular, the hand-coded-assembly-language-implemented interpreter can generally execute significantly faster than a typical interpreter.

Another problem with a standard interpreter such as a typical Java™ interpreter is that execution of a bytecode handler typically requires a jump-through-register operation, which is inefficient on most modern RISC (Reduced Instruction Set Computing) microprocessors. Accordingly, in one embodiment of the present invention, an interpreter that includes improved jump-through-register handling is provided. In particular, an interpreter efficiently handles a jump-through-register operation by speculatively computing a first target address of a second handler and a second target address of the second handler, and then selecting one of the precomputed target addresses in order to provide a hint to a branch unit of the microprocessor about the destination of an approaching jump-through-register.

Specifically, in one embodiment, the interpreter begins computing target handler addresses several bytes ahead in the instruction stream (e.g., bytecode stream). The speculative computation of the target handler addresses is based on the empirical observation that the distribution of bytecode lengths is usually significantly uneven. For example, in Java™ bytecode streams, the vast majority of bytecodes (both statically and dynamically) are either one or two bytes long. FIG. 8 provides an example Java™ bytecode stream. In particular, the left-hand column of FIG. 8 shows the offset in bytes from the beginning of the method's bytecodes to the start of each instruction. The center column of FIG. 8 shows the instruction and any operands. The right-hand column of FIG. 8 includes comments that are preceded with a double slash just as in Java™ source code.

More specifically, on entry into a particular handler for a first bytecode of a bytecode stream that includes a first bytecode, a second bytecode, and a third bytecode, the length of the first bytecode has been determined, as discussed above. The interpreter then speculatively computes two targets for the third bytecode handler. On entry into a particular handler for the second bytecode, the length of the second bytecode has also been determined, and the interpreter can select one of the two precomputed targets and then notify the branch unit via a hint about the destination of the next target when the second bytecode handler completes its execution. Accordingly, the interpreter can provide a hint to the branch logic unit about the destination of an approaching jump-through-register instruction.

FIG. 9 is a functional diagram of a bytecode stream in accordance with one embodiment of the present invention. At byte 0 of the bytecode stream is op0, which includes no arguments (operands) so this bytecode is one byte in length. Op1 begins at byte 1 and includes one argument, and thus, this bytecode is two bytes in length. Op2 begins at byte 3 and includes no arguments, and thus, this bytecode is only one byte in length. Similarly, op3 begins at byte 4 and includes no arguments, op4 begins at byte 5 and includes no arguments, and op5 begins at byte 6 and includes no arguments.

FIG. 10 is a block diagram of a memory 1000 such as a computer memory storing the bytecode stream of FIG. 9 in accordance with one embodiment of the present invention. As shown in FIG. 10, instruction 0 is one byte in length. Instruction 1 is two bytes and sequentially follows instruction 0 in memory 1000. Instruction 2, instruction 3, and instruction 4 are each one byte in length and stored sequentially in memory 1000. Finally, instruction 5 is two bytes in length and follows instruction 4 in memory 1000. Thus, when the interpreter is executing a handler for op0 of FIG. 9, the interpreter knows that op0 requires one byte. The interpreter can then precompute the handler address for op2 by speculatively computing a first target address, which assumes that op1 is one byte in length, and a second target address, which assumes that op1 is two bytes in length.

In other words, the interpreter is speculating that instruction 2 is stored either two bytes ahead or three bytes ahead of the current PC (Program Counter). In one embodiment, each thread of an executing program maintains its own PC register, or Program Counter, which is created when the thread is started. The PC register is one word in size, so it can hold both a native pointer and a return value. For example, as a thread executes a Java™ method, the PC register contains the address of the current instruction being executed by the thread. An address can be a native pointer or an offset from the beginning of a method's bytecodes or P-codes. If a thread is executing a native method, then the value of the PC register is undefined.

FIG. 11 provides pseudocode for an interpreter with improved jump-through-register handling in accordance with one embodiment of the present invention. In particular, FIG. 11 provides an op0 handler, an op1 handler, and an op2 handler written in pseudocode in accordance with one embodiment of the present invention. In the op0 handler, the interpreter begins computing the handler address for the op2 handler while executing the op0 handler. As discussed above, because the interpreter speculates that op1 is either one or two bytes in length, the op0 handler computes the handler address for the op2 handler by calculating the handler address for byte 2 and calculating the handler address for byte 3. The op0 handler then performs work for op0. The op0 handler then performs a jump-through-register operation to jump to the next handler address, which takes the interpreter to the op1 handler.

Upon entry into the op1 handler, the interpreter acquires the length of op1. Thus, the op1 handler can appropriately select the prefetched (precomputed) next handler address (next_handler_addr). In this case, because op1 is two bytes in length, the interpreter selects the handler address for byte 3. The op1 handler then computes the next handler address for the op3 handler. In particular, the interpreter calculates the handler address for byte 4 and calculates the handler address for byte 5, which is speculating that the op3 is either one or two bytes in length, respectively. The op1 handler then performs the work for op1. The op1 handler then performs a jump-through-register operation to jump to the next handler address, which takes the interpreter to the op2 handler.

Upon entry into the op2 handler, the interpreter knows the length of op2 and thus selects the next handler address appropriately. In this case, the op2 handler selects the handler address for byte 4, because the interpreter knows that op2 is one byte in length. The op2 handler performs a prefetch operation for prefetching an op4 handler address. In particular, the op2 handler calculates the handler address for byte 5 and calculates the handler address for byte 6, which is assuming that op3 is either one or two bytes in length, respectively. The op2 handler then performs the work for op2 appropriately. Finally, the op2 handler performs the jump-through-register operation to the next handler address, which takes the interpreter to the op3 handler.

Moreover, in one embodiment, an interpreter performs the above described prefetch of handler addresses without pre-computing the handler address for the same byte more than once. For example, an interpreter can be provided that would not calculate the handler address for byte 5 more than once, which in the interpreter implementation shown in FIG. 11 was calculated more than once, and specifically, the op1 handler and the op2 handler both calculated the handler address for byte 5. In particular, this can be implemented by only calculating the handler address for two bytes ahead if the next handler address is selected to have only been one byte ahead. For example, referring to FIG. 11, in the execution of the op2 handler, the next handler address is selected for byte 4, which represented a one byte ahead prefetch during the executing of the op1 handler. Thus, the op2 handler would only calculate the handler address for byte 6, which represents a two byte ahead prefetch, thereby avoiding calculating the handler address of byte 5 more than once (the handler address of byte 5 was calculated as a two byte ahead prefetch during the execution of the op1 handler).

Accordingly, the present invention provides an interpreter that precomputes target handler addresses in advance of an approaching jump-through-register operation. Moreover, in one embodiment, the precomputation of the handler addresses is inexpensive from a performance standpoint, because the handler addresses can be implemented as a shift operation and an add operation using only one memory access, as described above. For example, if an interpreter executing on a microprocessor efficiently performs the prefetch operation described above, then the interpreter in accordance with this embodiment can further improve performance of the interpreter by providing improved jump-through-register handling thereby avoiding a significant pipeline bubble penalty that would likely be suffered if the next handler address was not prefetched. Thus, this embodiment allows for a time shift in calculation of addresses well in advance of the actual jumps to the handlers, which advantageously reduces the amount of time, and thus the number of cycles, required to perform a jump-through-register operation.

In one embodiment, writing to (loading) a particular register of the microprocessor trips or triggers the prefetch logic (e.g., the branch logic unit) and trips the branch predictor to indicate that the prefetch logic should begin fetching from the address written in the register. For example, the register can be a typical link register.

In one embodiment, an interpreter that provides improved-jump-through-register handling is hand-coded in assembly language. In particular, the hand-coded-assembly-language-implemented interpreter can execute significantly faster than a typical interpreter.

Another important feature of a programming language such as the Java™ programming language is that it is a stack-based computer programming language. In particular, when a new thread of a Java™ program is launched, the Java™ VM creates a new Java™ stack for the thread. A Java™ stack stores a thread state in discrete frames. The Java™ VM performs two operations directly on Java™ stacks: it pushes frames onto the stack, and it pops frames from the stack. The method that is currently being executed by a thread is the thread's current method. The stack frame for the current method is the current frame. The class in which the current method is defined is called the current class, and the current classes constant pool is the current constant pool. As it executes a method, the Java™ VM keeps track of the current class and current constant pool. When the Java™ VM encounters instructions that operate on data stored in the stack frame, it performs those operations in the current frame. When a thread invokes a Java™ method, the Java™ VM creates and pushes a new frame onto the thread's Java™ stack. The new frame then becomes the current frame. As the method executes, it uses the frame to store parameters, local variables, intermediate computations, and other data.

A Java™ method can complete itself in either of two ways. If a method completes by executing a return instruction, the method has a normal completion. If the method completes by "throwing" an exception, the method has an abrupt completion. When a method completes, whether normally or abruptly, the Java™ VM pops and discards the method's stack frame. The frame for the previous method then becomes the current frame.

The data on a thread's Java™ stack is generally private to that particular thread, and there is not an easy way or advisable for a thread to access or alter the Java™ stack of another thread. When a thread invokes a method, the method's local variables are stored in a frame of the invoking thread's Java™ stack. Thus, the thread that invoked the method can access the local variables.

However, the Java™ stack need not be stored contiguously in memory. For example, frames can be allocated from a contiguous stack, or each frame can be allocated separately from a heap, or some combination of both. The actual data structures used to represent the Java™ stack depend on the particular implementation of a Java™ interpreter. For example, various implementations of the Java™ interpreter can allow users or programs to specify an initial size for Java™ stacks, as well as a maximum or minimum size.

Similar to the local variables, the operand stack is organized as an array of words. But unlike the local variables, which are accessed via array indices, the operand stack is accessed by pushing and popping values. If an instruction pushes a value onto the operand stack, a later instruction can pop and use that value.

The Java™ VM stores the same data types in the operand stack that it stores in the local variables: int, long, float, double, reference, and returnType. The Java™ VM converts values of type byte, short, and char to int before pushing them onto the operand stack.

Other than the program counter, which generally cannot be directly accessed by Java™ instructions, the Java™ VM specification requires no registers (e.g., for implementing the Java™ stack). Thus, the Java™ VM is stack-based rather than register-based, because its instructions take their operands from the operand stack rather than from registers. Instructions can also take operands from other places, such as from parameters immediately following the opcode in the bytecode stream, as discussed above, or from the constant pool.

The Java™ VM uses the operand stack as a work space. Many Java™ instructions pop values from the operand stack, operate on them, and push the result back onto the stack. For example, an "iadd" instruction adds two integers by popping two ints off the top of the operand stack, adding them, and pushing the int result back onto the stack. For example, the Java™ VM can be implemented to add two local variables that contain ints and store the int result in a third local variable as follows:

| | | |
|---|---|---|
| iload_0 | //push the int in local variable 0 | |
| iload_1 | //push the int in local variable 1 | |
| iadd | //pop two ints, add them, push //result | |
| istore_2 | //pop int, store into local //variable 2 | |

In the above sequence of Java™ bytecodes, the first two instructions, "iload_0" and "iload_1", push the ints stored in local variable position 0 and 1 onto the operand stack. The "iadd" instruction pops these two int values, adds them, and pushes the int result back onto the operand stack. The fourth instruction, "istore_2", pops the result of the iadd off the top of the operand stack and stores it into local variable 2. FIG. 12 is a functional diagram that provides a graphical depiction of the state of the local variables and the operand stack while executing the above bytecode stream. In FIG. 12, unused slots of the local variables and the operand stack are shown as blanks (blank slots).

According to the standard Java™ VM specification, implementation designers can represent the Java™ stack in whatever way they wish. Various Java™ interpreters use a variety of ways of implementing the Java™ stack in a computer memory (e.g., disk storage or cache memory), such as allocating each frame separately from a heap, allocating frames from a contiguous stack, or some combination of both.

However, accessing memory such as disk storage or even cache memory in order to push or pop from the Java™ stack significantly reduces the performance of a Java™ interpreter. One approach to deal with this problem is to provide a Java™ chip as discussed above, which provides special-dedicated stack registers that keep a certain depth of the Java™ stack in registers on the microprocessor rather than in memory that is off-chip such as disk storage or on-chip such as cache memory. But this approach requires providing and dedicating special registers for the Java™ stack. Moreover, providing a microprocessor that is specifically implemented to interpret or execute Java™ bytecodes quickly, is expensive and may be disadvantageous, because the Java™-specific microprocessor may not execute non-Java™ applications as efficiently as a general microprocessor, as discussed above.

Accordingly, FIG. 13 is a state diagram of a multi-state interpreter in accordance with one embodiment of the present invention. In particular, multiple versions of a Java™ interpreter are provided, in which each version is specific to a particular state. A state is defined by the number of registers that are storing elements from the top of the stack, that is, the number of elements stored in a Java™ stack that are currently written (loaded or stored) in registers on the microprocessor.

In one embodiment, four states are provided, because it has been empirically observed that if the top two or three elements of the Java™ stack are kept in registers of the microprocessor, then the number of memory accesses needed for stack operations is significantly reduced. In particular, four versions of the Java™ interpreter are provided, one version for each of the following cases: 0, 1, 2, or 3 stack elements stored in registers of the microprocessor. Thus, if each version of the multi-state interpreter is viewed as being a state in a finite-state automaton, then each different bytecode causes a deterministic transition to a new state. In FIG. 13, a "0" state refers to the state in which zero stack elements are stored in (general) registers of the microprocessor, a "1" state refers to the state in which one element of the stack (e.g., the top element of the stack) is stored in a register of the microprocessor, a "2" state refers to the state in which two elements of the stack (e.g., the top two elements of the stack) are stored in registers of the microprocessor, and a "3" state refers to the state in which three elements of the stack (e.g., the top three elements of the stack) are stored in registers of the microprocessor.

In particular, FIG. 13 shows the deterministic transition to a new state for an "iadd" operation, which uses two stack elements and produces one new element, which is the sum that is pushed onto the stack. If there are an insufficient number of stack elements stored in registers to complete the operation, then the interpreter determines the number of elements needed to be moved from memory (e.g., the stack stored in computer memory such as disk storage or cache memory) to the registers. For example, the iadd instruction is performed by popping two elements from the stack. If the interpreter is in state 2, then both of the two stack elements from the top of the stack are stored in registers of the microprocessor, and thus, the interpreter can use the two stack elements stored in registers. The interpreter then stores the result of the iadd operation, the sum, in a register (on the top of the stack). Thus, the interpreter is now viewed as having only one value on the stack stored in registers of the microprocessor. Thus, the interpreter transitions to state 1 as shown in FIG. 13. A different version of the interpreter would be used in state 1. The state 1 version of the interpreter executes bytecodes assuming that only one value is stored in registers of the microprocessor. If the next bytecode operation is a subtract operation, then the state 1 Java™ interpreter uses one value, one argument, from the registers of the microprocessor, and the other value, the other argument, is obtained from the top of the stack stored in memory, which requires a memory access (e.g., to cache memory or disk storage). The state 1 Java™ interpreter then pushes the result back onto the top of the stack, and in particular, stores it in a register of the microprocessor, and the interpreter remains in state 1.

Accordingly, in this embodiment, the number of values that are stored in registers, that is, the number of values from the top of the stack that are currently stored in registers of the microprocessor, vary dynamically depending on how the bytecode stream is flowing. Hence, the multi-state Java™ interpreter transitions between different states (e.g., states 0, 1, 2, and 3). Further, because it has been empirically observed that the Java™ interpreter executing bytecode streams usually only uses 0, 1, 2, or 3 elements from the top of the stack, the multi-state Java™ interpreter that includes four states as described above, can operate almost exclusively out of the registers thereby providing a Java™ interpreter with reduced memory access. Thus, the multi-state Java™ interpreter with reduced memory access significantly increases performance by operating in various states that are based on the number of stack elements stored in the registers of the microprocessor.

FIGS. 14A–14C provide pseudocode for bytecode handlers for each state of a three-state interpreter for an "iadd" Java™ bytecode in accordance with one embodiment of the present invention. In particular, "iadd-0 cached" bytecode handler performs the iadd operation assuming that no elements of the top of the stack are stored in the registers of the microprocessor, "iadd-1 cached" bytecode handler performs the iadd operation assuming that one element of the top of the stack is stored in one of the registers of the microprocessor, and "iadd-2 cached" bytecode handler performs the iadd operation assuming that two elements of the top of the stack are stored in the registers of the microprocessor. The bytecode handlers provided in FIGS. 14A–14C advantageously only load a stack element from memory if the stack element is not already stored a register of the microprocessor. Further, the bytecode handlers of the iadd operation as shown in FIGS. 14A–14C each write to a special register that tells the branch predictor to prepare to branch to the loaded address, which is advantageous for jump-through-register handling for an approaching jump-through-register operation, as discussed above. In one embodiment, a unique handler is provided for each bytecode and for each state of a multi-state interpreter.

In one embodiment, an efficient transition between the various states of the multi-state interpreter is provided by storing the bases (base addresses) of the interpreter loops for the various states in various registers of the microprocessor. For example, $R_0$ is the base of the interpreter loop for state 0, $R_1$ is the base for the interpreter loop for state 1, $R_2$ is the base of the interpreter loop for state 2, and $R_3$ is the base for the interpreter loop for state 3.

FIG. 15 provides pseudocode for address generation of a handler for a multi-state interpreter in accordance with one embodiment of the present invention. In particular, FIG. 15 provides pseudocode to jump to the next bytecode handler from a state 1 iadd handler and a per-opcode-handler size of 64 bytes. Accordingly, the calculation of the next bytecode handler during a state transition can be efficiently implemented as shown in FIG. 15, which is similarly discussed above with respect to FIG. 7.

Alternatively, a different number of states can be selected for a multi-state interpreter and interpreter loops provided for the selected number of states accordingly. Further, the multi-state interpreter approach is advantageous for interpreted stack-based languages generally and is not limited to the Java™ programming language.

Accordingly, the present invention provides an interpreter with reduced memory access and improved jump-through-register handling. In one embodiment, a Java™ interpreter with reduced memory access and improved jump-through-register handling is provided. For example, an interpreter for an interpreted programming language that is compiled into bytecode streams or P-code streams that include bytecodes or P-codes, respectively, of an empirically predictable length would significantly benefit from the present invention. Also, an interpreter for an interpreted programming language that uses bytecode or P-code handlers that can be stored in a table of cells would significantly benefit from the present invention.

Although particular embodiments of the present invention have been shown and described, it will be obvious to those skilled in the art that changes and modifications may be made without departing from the present invention in its broader aspects, and therefore, the pending claims are to encompass within their scope all such changes and modifications that fall within the true scope of the present invention.

What is claimed is:

1. A method for prefetching instructions in an interpreter of variable length instructions of a virtual machine, comprising:
   while executing a handler for a first instruction, computing a first target address and a second target address, said first target address and said second target addresses each corresponding to a prediction of a starting address of a handler of a second instruction; and
   while executing a handler for a third instruction, said third instruction being an instruction provided in order of execution between said first and said second instructions, selecting one of said first and second target addresses as a starting address of a handler of said second instruction.

2. The method of claim 1 wherein said computing said first target address and said second target addresses comprises speculatively computing the target address for the handler of said second instruction.

3. The method of claim 2 wherein the handler for said first instruction is for a first bytecode of a bytecode stream, and the handler for said second instruction is for a third bytecode of the bytecode stream, which is separated by a second bytecode in the bytecode stream that is stored sequentially in a memory.

4. The method of claim 3 wherein computing the first target address comprises generating a handler address for one byte ahead of an address for the second bytecode.

5. The method of claim 4 wherein computing the second target address comprises generating a handler address for two bytes ahead of the address of the second bytecode.

6. The method of claim 5 wherein said selecting one of the first and second target addresses occurs during execution of the handler for the second bytecode depending on a length of the second bytecode, said method setting the next handler address equal to the selected target address.

7. The method of claim 3 where said computing a first target address and a second target address further comprises calculating a handler address for one byte ahead of the second bytecode, and calculating a handler address for two bytes ahead of the second bytecode.

8. The method of claim 7 further comprising executing a jump-through-register using the selected handler address.

9. The method of claim 8 wherein the interpreter calculates the handler address for a particular byte only once.

10. The method of claim 8 wherein the bytecode stream is a Java™ bytecode stream.

11. The method of claim 8 wherein the interpreter is implemented in assembly language.

12. An apparatus comprising:
- an interpreter that executes on a machine for interpreting virtual machine instructions; and
- a table including a plurality of fixed size cells stored in a memory, said cells each including a handler for an instruction of the virtual machine;
- wherein said interpreter generates a handler address for a bytecode of a bytecode stream by performing a shift operation and an add operation using an offset into the table and a table base address and prefetches the handler address for an approaching jump-through-register operation by speculatively computing a first target address and a second target address, the first target address being the handler address for one byte ahead of a next bytecode in the bytecode stream, and the second target address being a handler address for two bytes ahead of the next bytecode.

13. The apparatus of claim 12 wherein writing to a predetermined register of the machine triggers a branch logic unit of the machine to use a prefetched next handler address for an approaching jump-through-register operation.

14. The apparatus of claim 12 wherein the interpreter is a Java™ interpreter.

15. The apparatus of claim 13 wherein the interpreter is implemented in assembly language.

* * * * *